United States Patent
Shveidel et al.

(10) Patent No.: US 10,740,159 B2
(45) Date of Patent: Aug. 11, 2020

(54) SYNCHRONIZATION OBJECT PRIORITIZATION SYSTEMS AND METHODS

(71) Applicant: EMC IP Holding Company LLC, Hopkinton, MA (US)

(72) Inventors: Vladimir Shveidel, Pardes-Hana (IL); Anton Kucherov, Dudley, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 233 days.

(21) Appl. No.: 16/043,426

(22) Filed: Jul. 24, 2018

(65) Prior Publication Data

US 2020/0034212 A1 Jan. 30, 2020

(51) Int. Cl.
*G06F 9/52* (2006.01)
*G06F 9/48* (2006.01)

(52) U.S. Cl.
CPC .............. *G06F 9/52* (2013.01); *G06F 9/4818* (2013.01)

(58) Field of Classification Search
None
See application file for complete search history.

(56) References Cited

U.S. PATENT DOCUMENTS

| | | | | |
|---|---|---|---|---|
| 6,167,424 A * | 12/2000 | Bak | ............. | G06F 9/4843 718/100 |
| 6,510,437 B1 * | 1/2003 | Bak | ............. | G06F 9/4843 707/783 |
| 7,130,905 B2 * | 10/2006 | Dinker | ............. | G06F 9/52 709/225 |
| 7,500,036 B2 * | 3/2009 | McKenney | ............. | G06F 9/52 710/200 |
| 10,565,024 B2 * | 2/2020 | Dice | ............. | G06F 9/52 |
| 2002/0178208 A1 * | 11/2002 | Hutchison | ............. | G06F 9/52 718/102 |

OTHER PUBLICATIONS

Klaftenegger et al. "Queue Delegation Locking", 2017 IEEE, pp. 687-704.*
Lin et al. "Synchronization-Aware Dynamic Thread Scheduling for Improving Performance and Saving Energy in Multi-Core Embedded Systems", 2012 IEEE, pp. 13-18.*

\* cited by examiner

*Primary Examiner* — Van H Nguyen
(74) *Attorney, Agent, or Firm* — Daly, Crowley Mofford & Durkee, LLP

(57) ABSTRACT

A method for controlling a synchronization object of a computer processing system that includes executing a plurality of processing threads, each of the processing threads having a priority level within the computer processing system. At least one of the plurality of threads requests a lock to the synchronization object. The priority of lower priority processing threads that have a lock to the synchronization object or are waiting in a waiting queue for the synchronization object are promoted. The lower priority threads having a priority lower than the lock requesting thread are promoted to a priority level that is at least as high as that of the lock requesting thread. Upon a release of the lock by a promoted processing thread, returning the promoted processing thread to the original priority level from which the processing thread was promoted.

17 Claims, 10 Drawing Sheets

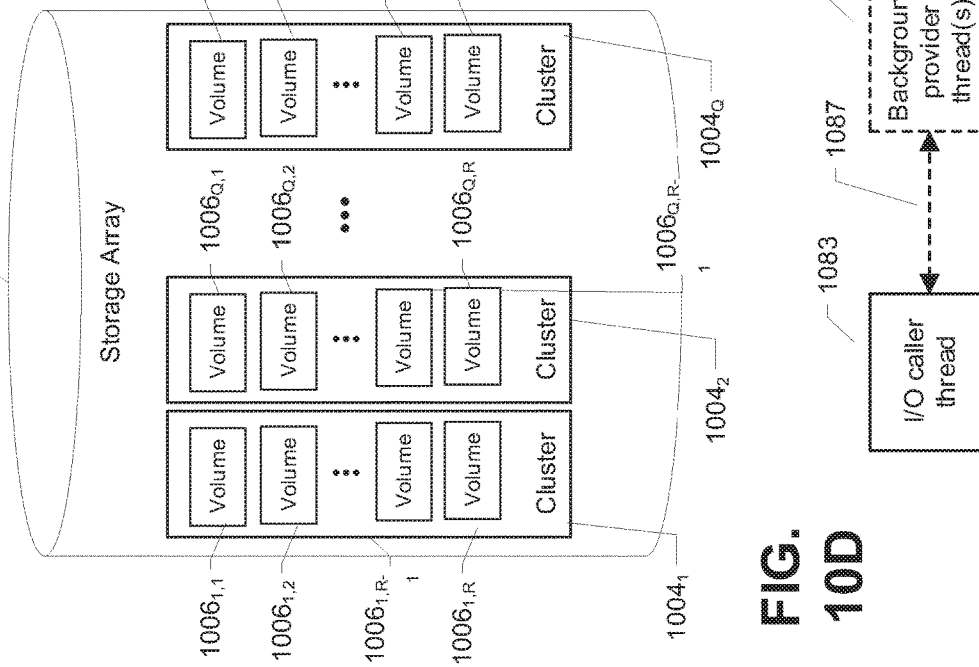
FIG. 10A
FIG. 10B
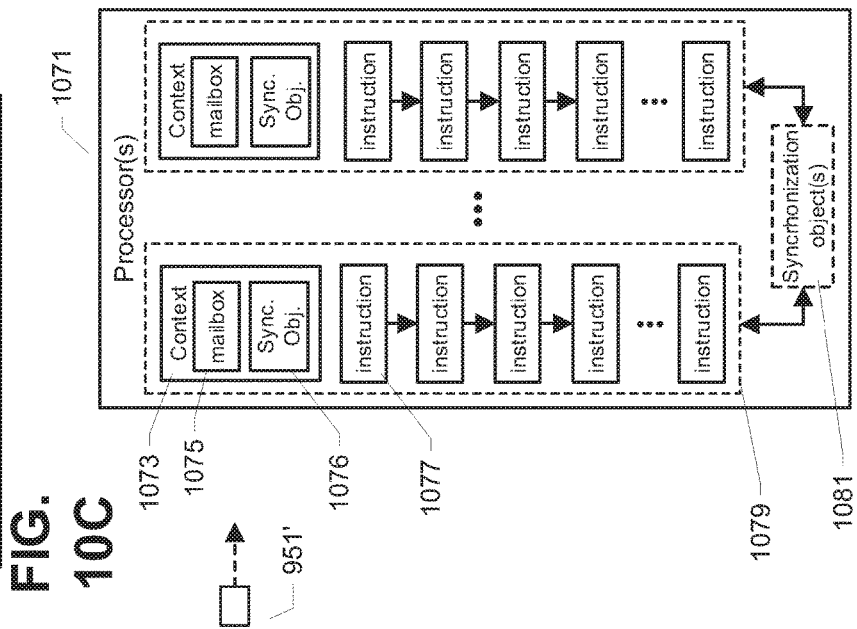
FIG. 10C
FIG. 10D

SYNCHRONIZATION OBJECT PRIORITIZATION SYSTEMS AND METHODS

BACKGROUND

Many types of computer-based resources, including shared resources, are utilized with synchronization processes to ensure proper and efficient use of those resources. Such resources include, for example, storage devices, databases, and computer processors. Synchronization may need to occur, for example, when one or more processing threads concurrently need use of those resources. Often when multiple threads need use of a single resource or a resource that requires atomic access (e.g., a memory object) a synchronization object (e.g., a semaphore object) may be employed to manage use of the resource between the threads. Other resources can include, for example, linked lists, queues, or storage offsets (e.g., that require access serialization). For example, the synchronization object may place some threads in a waiting queue while allowing another thread to utilize the resource.

In certain circumstances, different processes trying to access the same resource carry different overall system priorities and/or importance. For example, a thread which is utilizing a storage device to store or retrieve critical or time sensitive data has a greater priority than a thread utilizing the storage device to clean up temporary files. In some cases, a lower priority thread may already have a lock on the resource and/or other lower priority threads may be ahead of higher priority threads in a resource waiting queue. In some cases, the higher priority threads may have to wait for the lower priority threads to finish processing before they can continue with their own processing, which may be detrimental to overall system performance.

For example, FIG. 1 shows a high priority thread 10 requesting a lock to a synchronization object at 15 which a low priority background thread 50 had previously acquired a lock to at 55. While the background thread 50 retains a lock to the synchronization object, the high priority thread 10 must wait in a waiting queue for a time period 20 for the background thread to release its lock at 60 before the high priority thread obtains a lock at 25.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of embodiments are directed to systems and methods for synchronizing and prioritizing the use of computer-based resources including data storage resources.

An aspect of embodiments provides a system for controlling a synchronization object of a computer processing system including one or more processors programmed and configured to cause the execution of one or more processing threads.

In one aspect, methods for controlling a synchronization object of a computer processing system comprise: executing a plurality of processing threads, each of the processing threads having a priority level within the computer processing system; at least one of the plurality of threads requesting a lock to the synchronization object; promoting the priority of lower priority processing threads having a lock to the synchronization object or are waiting in a waiting queue for the synchronization object, the lower priority threads have a priority lower than the lock requesting thread and are promoted to a priority level that is at least as high as that of the lock requesting thread; upon a release of the lock by a promoted processing thread, returning the promoted processing thread to the original priority level from which the processing thread was promoted.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. Furthermore, the drawings are not necessarily to scale, emphasis instead being placed on the concepts disclosed herein.

FIGS. 10A-D shows further details of a system that include enhanced locking.

DETAILED DESCRIPTION

Aspects of embodiments are directed to systems and methods for implementing synchronization objects, including abort procedures for synchronization objects. It will be further understood that various changes in the details, materials, and arrangements of the parts that have been described and illustrated herein might be made by those skilled in the art without departing from the scope of the following claims.

Figure 1:
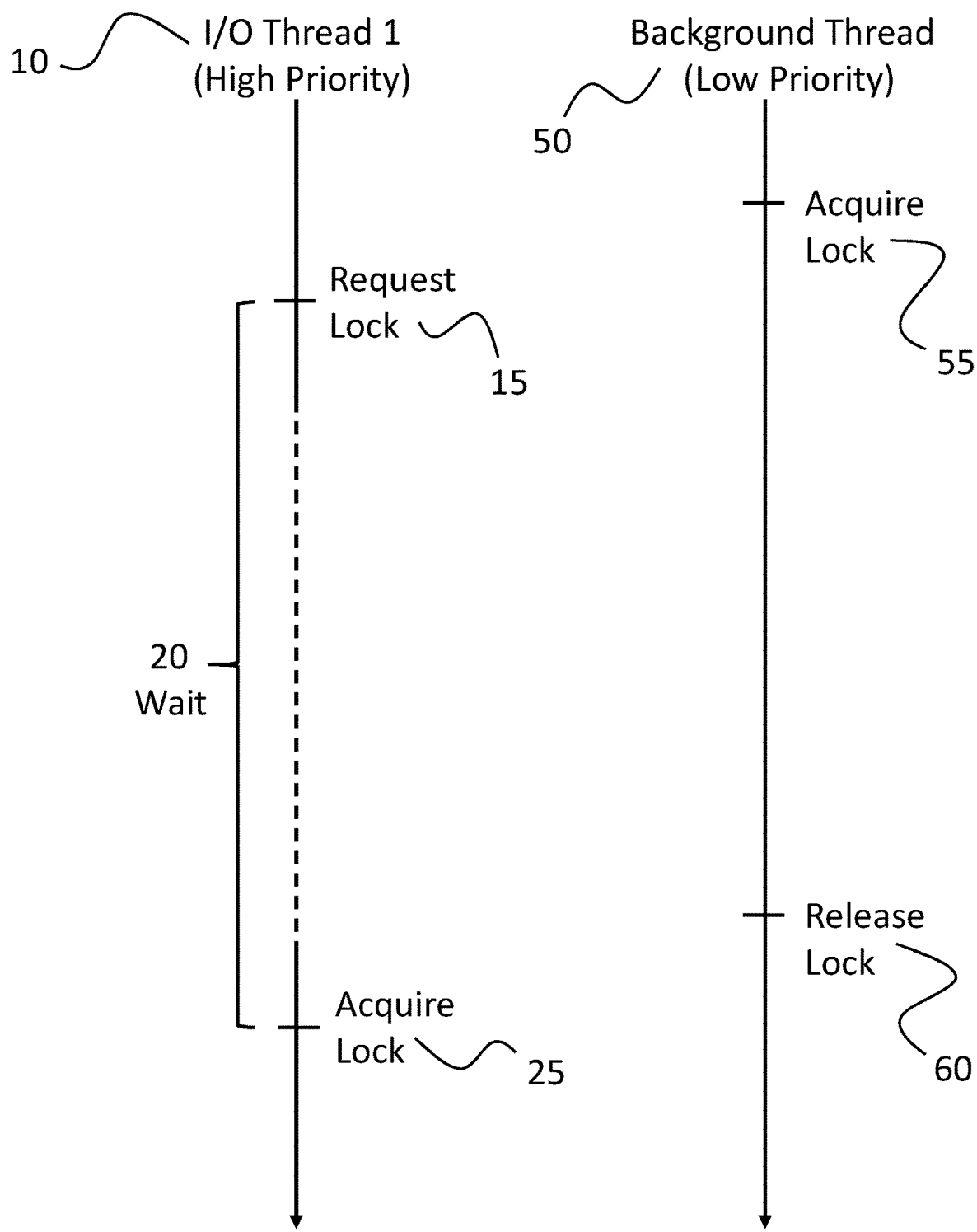
FIG. 1 is an illustrative flow diagram of multiple processes utilizing a synchronization object.
Figure 2:
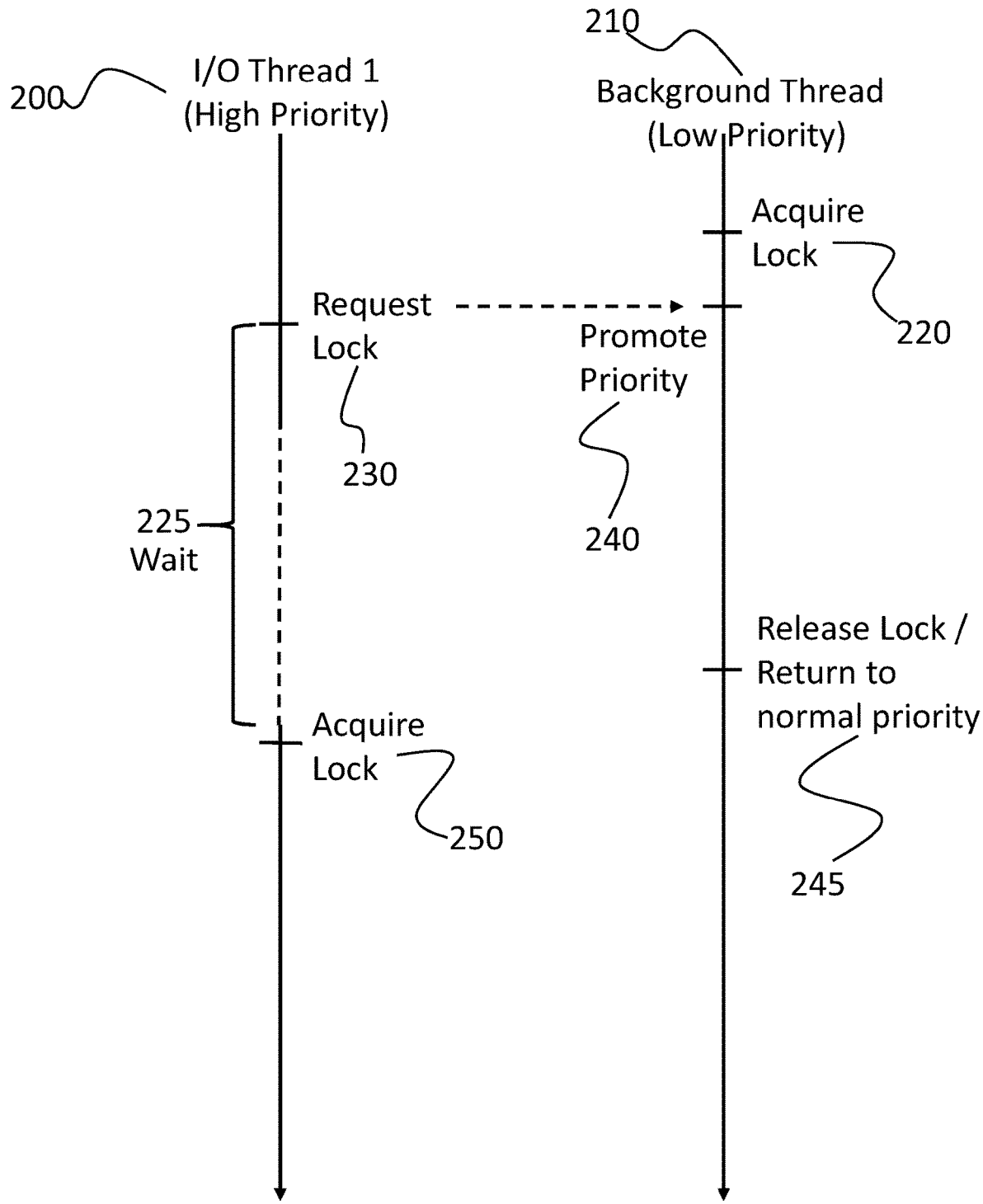
FIG. 2 is an illustrative flow diagram of a high priority thread that waits for synchronization objects and a promoted low priority thread utilizing a synchronization object according to an embodiment.

FIG. 2 is an illustrative flow diagram of a high priority thread 200 that waits for synchronization objects and a promoted low priority thread 210 utilizing a synchronization object according to an embodiment. The low priority thread 210 (e.g., a background thread) acquires a lock to the synchronization object at 220. In embodiments, the synchronization object can be associated with, for example, storage devices, databases, and computer processors. In an embodiment, the high priority thread 200, has a higher priority than the low priority thread within the system in which the threads operate. The high priority thread 200 can be associated with, for example, real time processing of data input/output (I/O) operations that require immediate processing as opposed to, for example, a low priority thread that can perform functions in the background (e.g., cleanup) while higher priority threads are not busy.

In an embodiment, the high priority thread 200 requests a lock to the synchronization object at 230, which the high priority thread 200 will have to wait for until the synchronization object becomes available. In an embodiment, the priority of the low priority thread 210 is promoted at 240 in order to speed up the processing of low priority thread 210, permit the low priority thread 210 to finish completing its processing with the lock to the synchronization object and releasing the lock at 245 more quickly, and thus shortening the time the high priority thread 200 waits during wait period 225 before obtaining a lock to the synchronization object at 250. In an embodiment, the promotion of the low priority thread 210 is a system wide promotion that allows the low priority thread to process various tasks it performs more quickly while holding onto the lock to the synchronization object.

In an embodiment, the tasks performed more quickly by the promoted low priority thread 210 can include prioritized access to memory (e.g., a cache), access to processors, and/or other resources. In some embodiments, prioritized access can include having positions of the low priority thread 210 in synchronization waiting queues advanced over lower priority processes.

In an embodiment, after the promoted low priority thread 210 releases the lock to the synchronization object at 245, the low priority thread 245 returns from a state of promoted priority to the original priority it had prior to the promotion. In an embodiment, the low priority thread 245 is configured to return itself to the original priority after releasing the lock.

Figure 3:
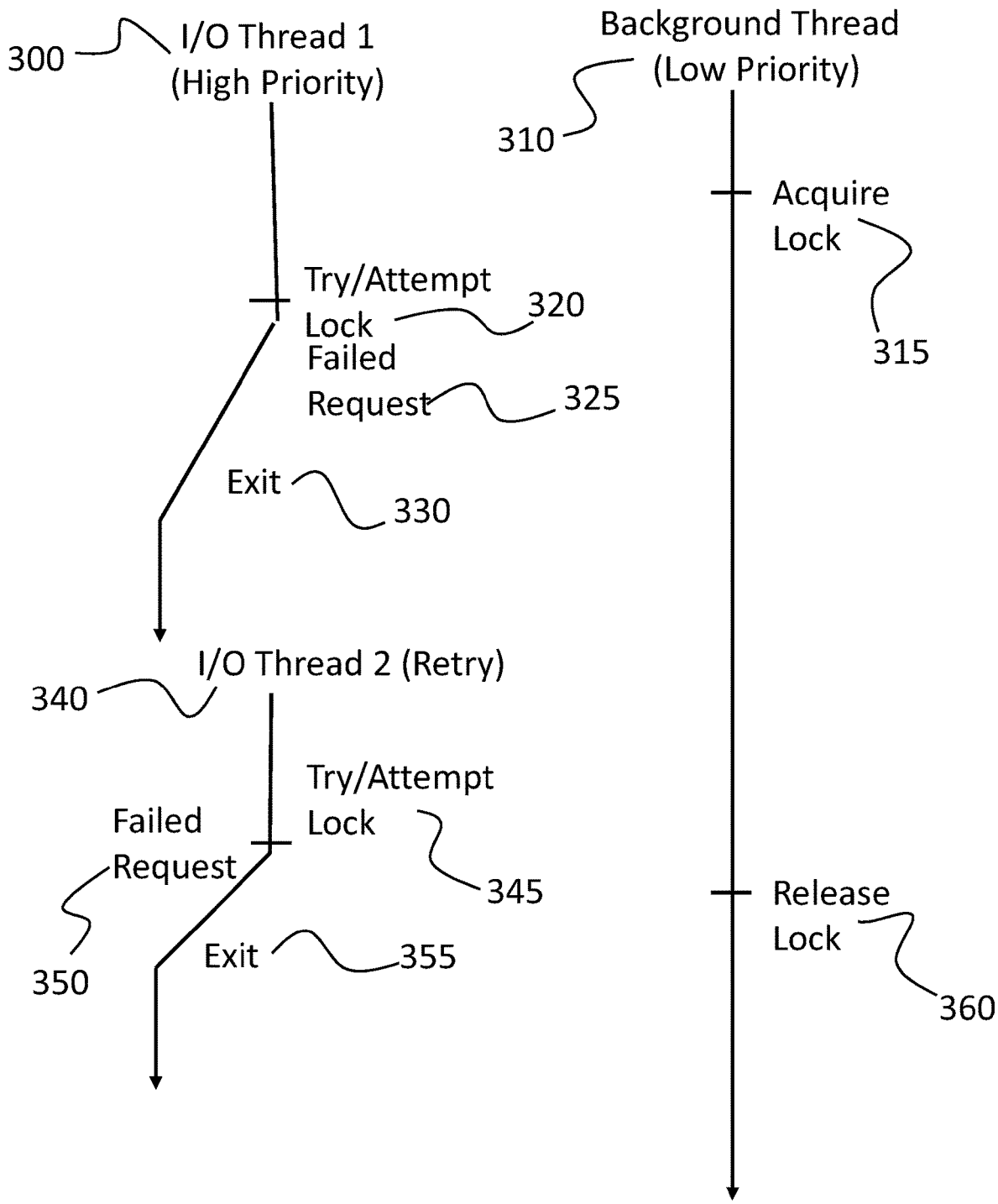
FIG. 3 is an illustrative flow diagram of multiple high priority threads and a low priority thread utilizing a synchronization object according to an embodiment.

FIG. 3 is an illustrative flow diagram of multiple high priority threads and a low priority thread utilizing a synchronization object according to an embodiment. In an embodiment, a process wishes to obtain a lock to a synchronization object to complete high priority tasks at which time a lower priority thread 310 has a lock to the synchronization object it obtained at 315.

In an embodiment, the process can utilize high priority threads (e.g., high priority threads 300 and 340) configured to make attempts (at 320 and 345) at obtaining the lock until the synchronization object becomes available. In an embodiment, threads 300 and 340 are configured to either obtain a lock to the synchronization object when requested or to return immediately if the synchronization object is not available at the time of the request. It should be noted that threads 300 and 340 relate to the same IO request. That is, thread 340 is a retry of the same request that failed in 330. It is understood that the original IO (300) and its retry (340) failed which can result in a less than optimal client experience.

Figure 4:
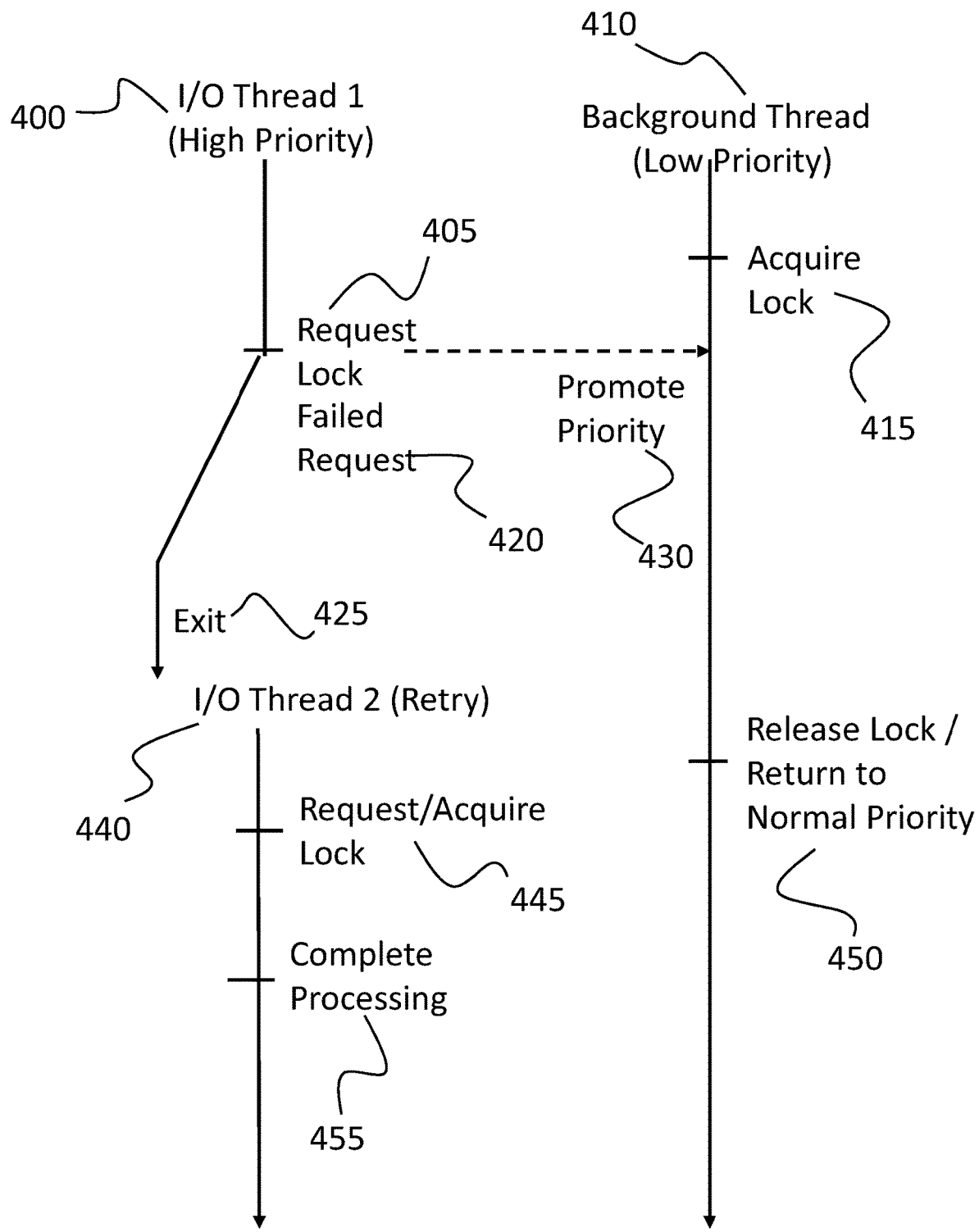
FIG. 4 is an illustrative flow diagram of multiple high priority threads and a promoted low priority thread utilizing a synchronization object according to an embodiment.

As shown, when the high priority threads 300 and 340 each try to obtain a lock, the lock was held by the low priority thread 310 and, accordingly, they fail to obtain the lock at 325 and 350. In embodiments, the failed request 325 at or about the same time as the try/attempt lock 320. In an embodiment, a return code is immediately returned (e.g., by way of a function call) at 325 and 350, indicating that the attempts to obtain a lock failed. In an embodiment, each of the threads 300 and 340 terminate after the failed requests and perform exit code at 330 and 355 prior to terminating FIG. 4 is an illustrative flow diagram of multiple high priority threads 400 and 440 and a promoted low priority thread 410 utilizing a synchronization object according to an embodiment. As in the embodiment of FIG. 3, multiple high priority threads are utilized by a process to gain a lock to a synchronization object. When high priority thread 400 requests a lock at 405, low priority thread 410 has a lock to the synchronization object (which it obtained at 415). Because the lock is unavailable to high priority thread 400, high priority thread 400 promotes the priority of the low priority thread 410 such as, for example, described in connection with various embodiments herein.

Because low priority thread 410 is promoted, it may more quickly process various tasks while holding the lock such as compared with a lower priority thread (e.g., unpromoted thread 310 of FIG. 3). Low priority thread 410 releases a lock to the synchronization object at 450 and, such as described in other embodiments, returns to its original priority status.

After high priority thread 400 fails to obtain a lock at 420 and exits at 425, the process executes another high priority thread 440 in a retry attempt to obtain a lock to the synchronization object. Because the synchronization object is now available, high priority thread 440 obtains a lock to the synchronization object at 445 and performs processing utilizing the synchronization object at 455.

Figure 5:
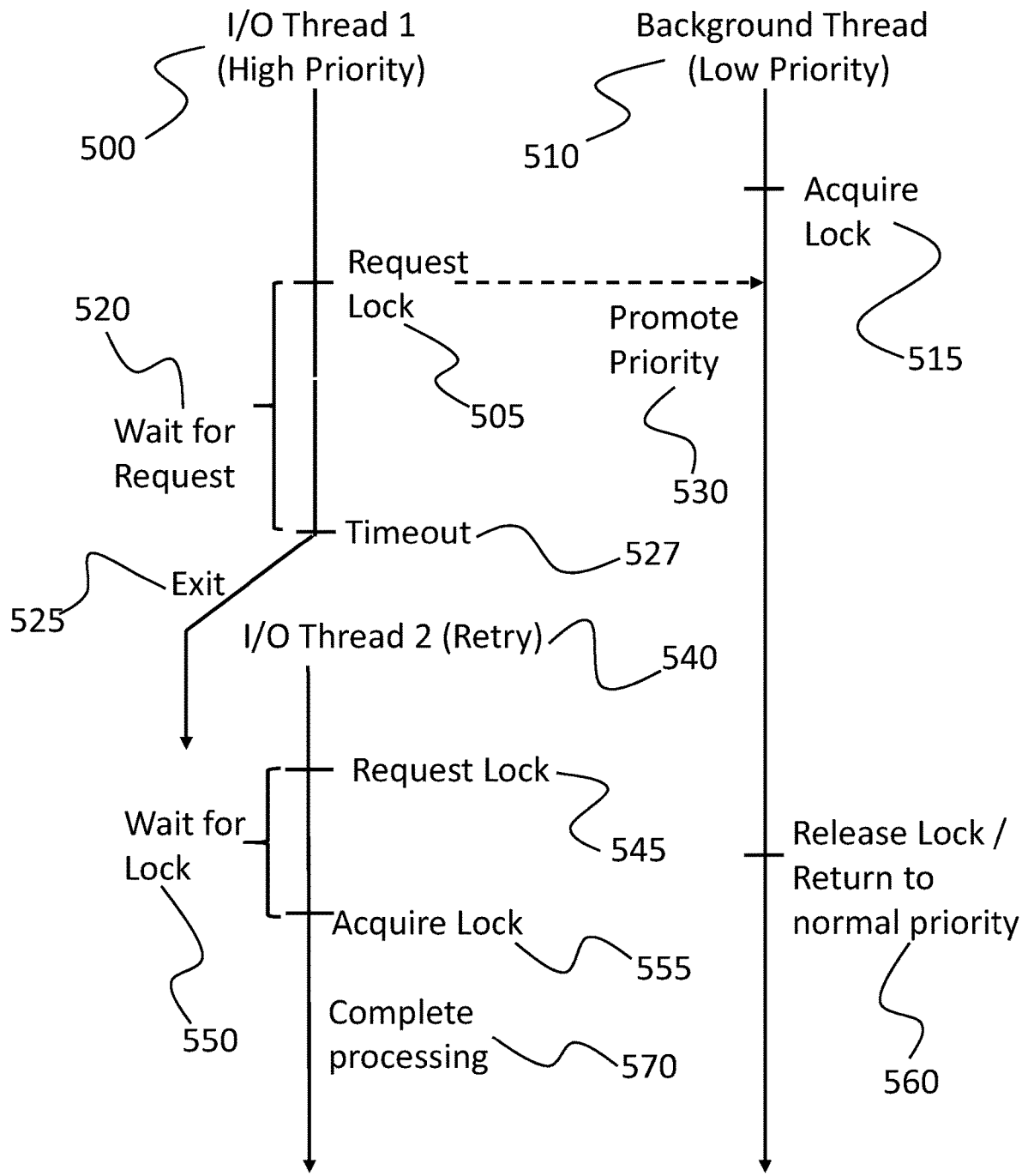
FIG. 5 is an illustrative flow diagram of multiple high priority waiting threads and a promoted low priority thread utilizing a synchronization object according to an embodiment.

FIG. 5 is an illustrative flow diagram of multiple high priority waiting threads 500 and 540 and a promoted low priority thread 510 utilizing a synchronization object according to an embodiment. Similar to other embodiments described herein, a process utilizes multiple high priority threads (500 and 540) to obtain a lock to a synchronization object that has been locked by a low priority thread 510, by promoting the low priority thread 510 at 530 in order to speed up processing and shorten the promoted thread's use/lock of the synchronization object. With the present embodiment, the high priority threads 500 and 540 are configured to wait (during periods 520 and 550) for a lock to a synchronization object before either timing out and failing a request for the lock at 527 and 525 or acquiring a lock at 555 and completing processing with a lock to the synchronization object.

In embodiments, the wait time before timing out can be configured with predetermined maximum timeout periods. As in various embodiments described herein, once the promoted low priority thread 510 releases a lock to the synchronization object at 560, it is returned to its original low priority status.

Figure 6:
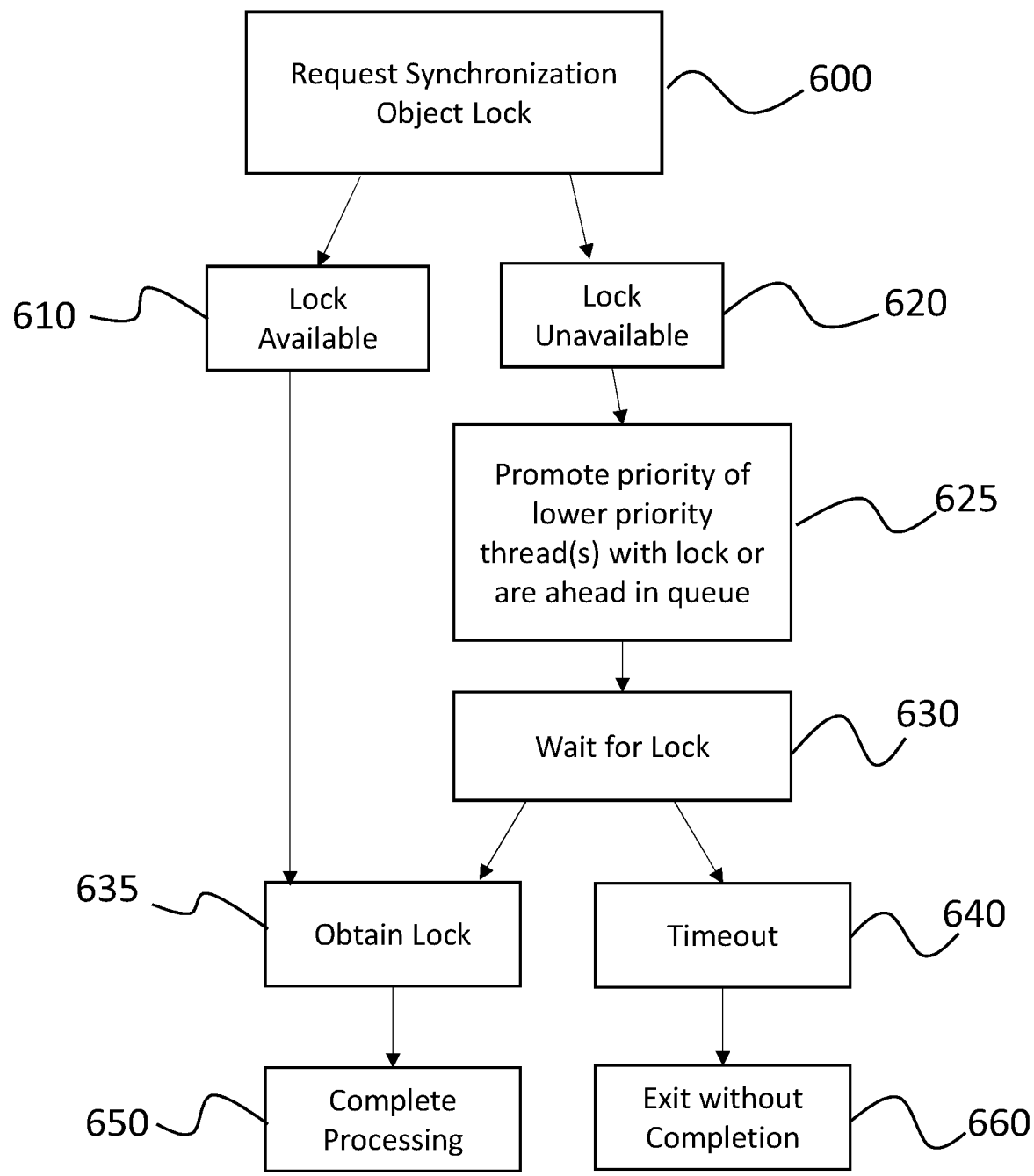
FIG. 6 is an illustrative process flow diagram of a high priority thread requesting a lock to a synchronization objection according to an embodiment.

FIG. 6 is an illustrative process flow diagram of a high priority thread requesting a lock to a synchronization objection according to embodiments. A synchronization object lock by the thread is requested at 600. If the lock is available at 610, the thread obtains the lock at 635 and completes processing with the lock at 650.

If the lock is unavailable at 620, the high priority thread promotes the priority of any low priority threads owning the lock and/or threads waiting in a synchronization object waiting queue such as further described herein. In an embodiment, the high priority thread waits for a lock to the synchronization object during a predetermined timeout period at 630. If the thread obtains a lock before the end of the timeout period at 635, the thread can complete processing at 650 utilizing the synchronization object. Otherwise, if the timeout period expires without the thread obtaining a lock, the thread exits without completing tasks utilizing the synchronization object 660.

In embodiments, the one or more high priority threads return with codes and/or flags indicating whether the thread(s) failed or succeeded in obtaining a lock.

Figure 7:
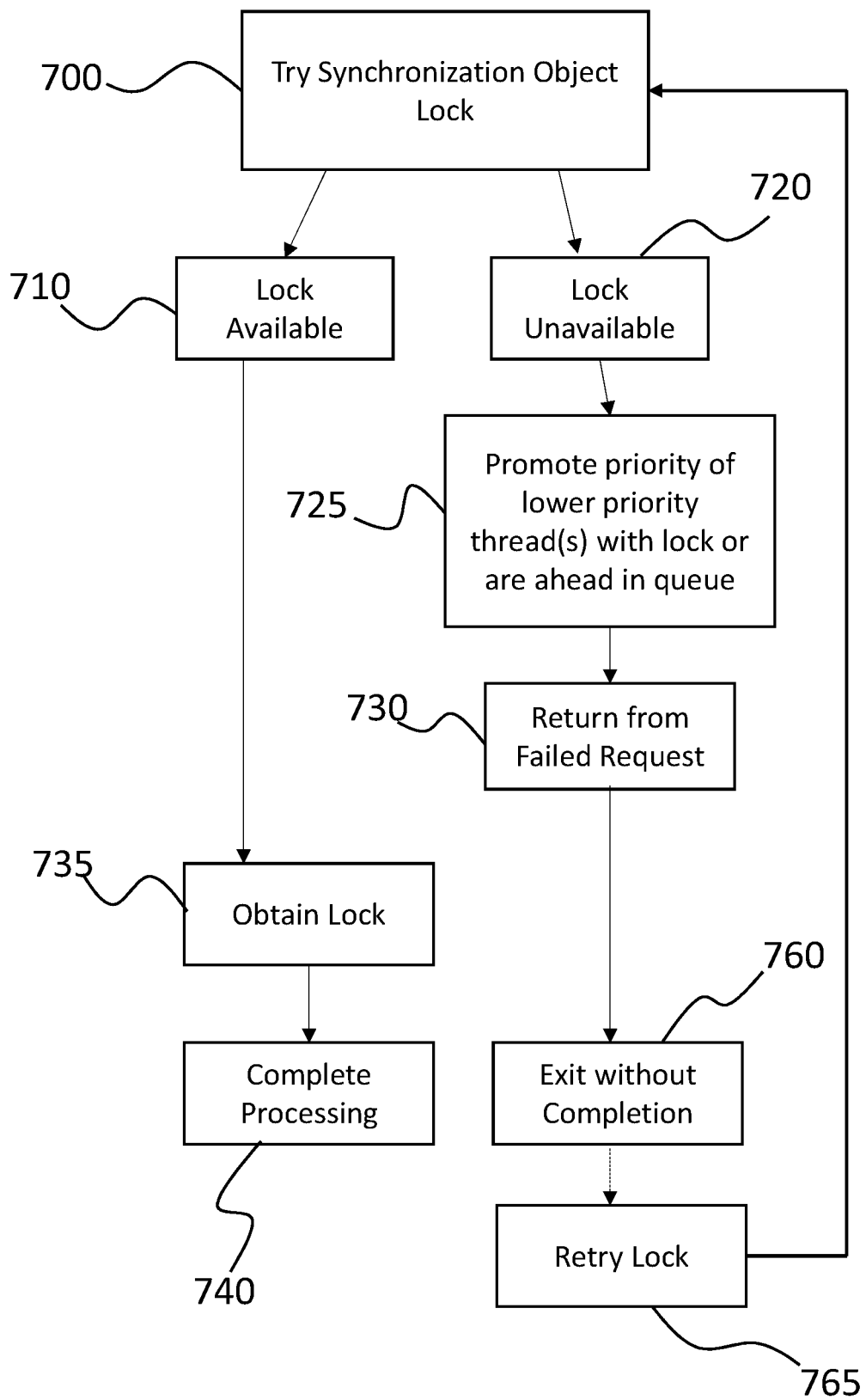
FIG. 7 is an illustrative process flow diagram of a process for obtaining a lock with one or more high priority threads according to an embodiment.

FIG. 7 is an illustrative process flow diagram of a process for obtaining a lock with one or more high priority threads according to embodiments. In an embodiment, a high priority thread requests a lock to a synchronization object at 700. If a lock is available at 710, the thread obtains a lock at 735 and completes processing utilizing the synchronization object at 740.

If a lock is unavailable at 720, the high priority thread promotes the priority of any low priority threads owning the lock and/or threads waiting in a synchronization object waiting queue at 725 such as further described herein. In the present embodiments, the high priority threads do not wait during a timeout period such as described in reference to FIG. 6 and return immediately if a lock is unavailable at 720 and exit without completion at 760. As described herein, return code(s) and/or flags can be used to indicate whether the threads succeeded in obtaining a lock.

In embodiments, if a high priority thread fails to obtain a lock and exits without completion at 760, another high priority thread can be executed to attempt a retry at obtaining a lock to the synchronization object such as, for example, shown in reference to FIGS. 4 and 5. The additional high priority thread can then repeat processing at 700 (or, for example, at 600).

Embodiments provide enhanced locking over conventional lock synchronization object with priority promotion and abort-able by timeout. The enhanced locking provides promoting priority of the thread that holds the lock up to priority of the thread that requests the occupied lock. If there is high priority waiter, the low-priority holder-thread (holding the lock) will proceed working with "inherited" high priority. The priority of the holder thread (owning the lock) is returned to its normal value (if it was promoted) when the holder thread frees the lock (e.g., call Unlock( )). Enhanced locking embodiments may allow pass of a required timeout to a Lock( ) API, and when the timeout expired, the Lock( ) API returns "failure".

The EnhancedLock object description can include extensions of a LOCK object/class. A LOCK object can provide the following API/methods.

Lock(LOCK_object)—get exclusive or non-exclusive ownership on LOCK_object (it is supposed that that Lock(LOCK_object) may cause blocking/waiting until the LOCK_object is free but the API always succeed—no return code.

TryLock(LOCK_object)—try to get ownership if possible, return "failure" otherwise UnLock(LOCK_object)—release the LOCK_object The LOCK_object can include:

Atomic object that provides Atomic_Test_and_Set operation used by the locking mechanism Waiting Queue, where threads waiting for the LOCK_object freeing are queued.

Embodiments of enhanced lock can include an example API having Lock(EnhancedLock_object, Timeout), TryLock(EnhancedLock_object), and UnLock(EnhancedLock_object). When Lock( ) or TryLock( ) API is called by high priority thread, the priority of the current Lock-holder thread and priority of all threads waiting for the Lock (i.e. threads queued in the Lock_object's WaitingQueue) are promoted up to the caller-thread priority (if priority of the caller thread is higher than priority of the Lock-holder thread). When the thread frees the Lock, e.g., calls Unlock( ) API—the normal value of this thread priority is restored. Therefore, the low priority thread work with high (promoted) priority all the time it owns the Lock, that high priority thread is waiting for.

In embodiments, enhanced lock can include a Lock(EnhancedLock_object, Timeout) API with an additional parameter (Timeout) passed to the extended Lock( ) API. This parameter defines the maximum waiting time allowed. When (if) this timeout expired, the waiting for the Lock is aborted and Lock( ) API completed. The extended Lock (EnhancedLock_object, Color) API may return returns with the following results:

LOCK_GOT_RESULT if lock is obtained

ABORTED_RESULT if waiting was aborted by timeout expiration (and Lock was not acquired as such)

In embodiments, the result (return code) of Lock( ) API is checked and if the result is ABORTED_RESULT (that means the Lock was not obtained within the required timeout), the client's request is aborted and a "Busy" result is sent to the client so that the client receives a reply within an acceptable timeout and may retry the request. The repeated request will likely succeed since the previous failure was caused by some random anomaly.

Embodiments of enhanced locking address disadvantages of conventional locking by providing a guaranteed response time even in case of different anomalies. In addition, a high priority (latency guaranteed) thread does not wait for low priority (non-guaranteed) thread since in this case the low priority thread is temporary promoted to high priority.

Figure 8:
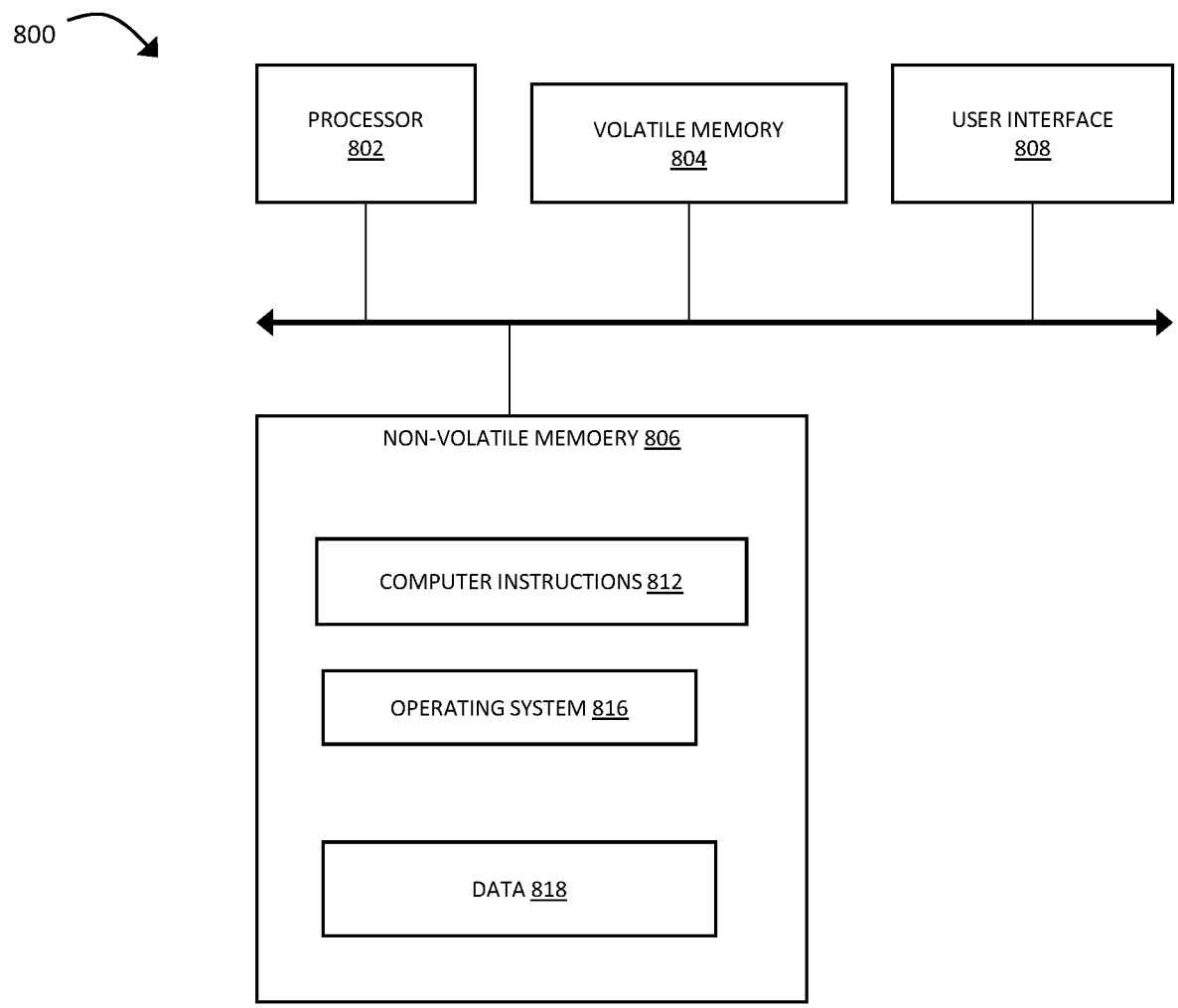
FIG. 8 is an illustrative block diagram of a computer system/processor for programming, configuring, and implementing various components of synchronization processing system according to embodiments.

Referring to FIG. 8, an illustrative block diagram of an embodiment is provided of a computer system/controller 800 used with various devices of the synchronization object processing system in accordance with embodiments (e.g., such as the processing threads and synchronization objects of FIGS. 1-7). A computer system 800 includes a processor 802, a volatile memory 804, a non-volatile memory 806 (e.g., hard disk) and a user interface (UI) 808 (e.g., a graphical user interface, a mouse, a keyboard, a display, touch screen and so forth). The non-volatile memory 806 stores computer instructions 812, an operating system 816 and data 818. In one example, the computer instructions 812 are executed by the processor 802 out of volatile memory 804 to perform all or part of the processes described herein (e.g., processes illustrated and described in reference to FIGS. 1 through 7).

These processes are not limited to use with particular hardware and software; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. In embodiments, the processor can include ASIC, FPGA, and/or other types of circuits. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes of FIGS. 1 through 7 are not limited to the specific processing order illustrated. Rather, any of the processing blocks of the Figures may be re-ordered, combined or removed, performed in parallel or in serial, as necessary, to achieve the results set forth above.

The processing blocks associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Figure 9:
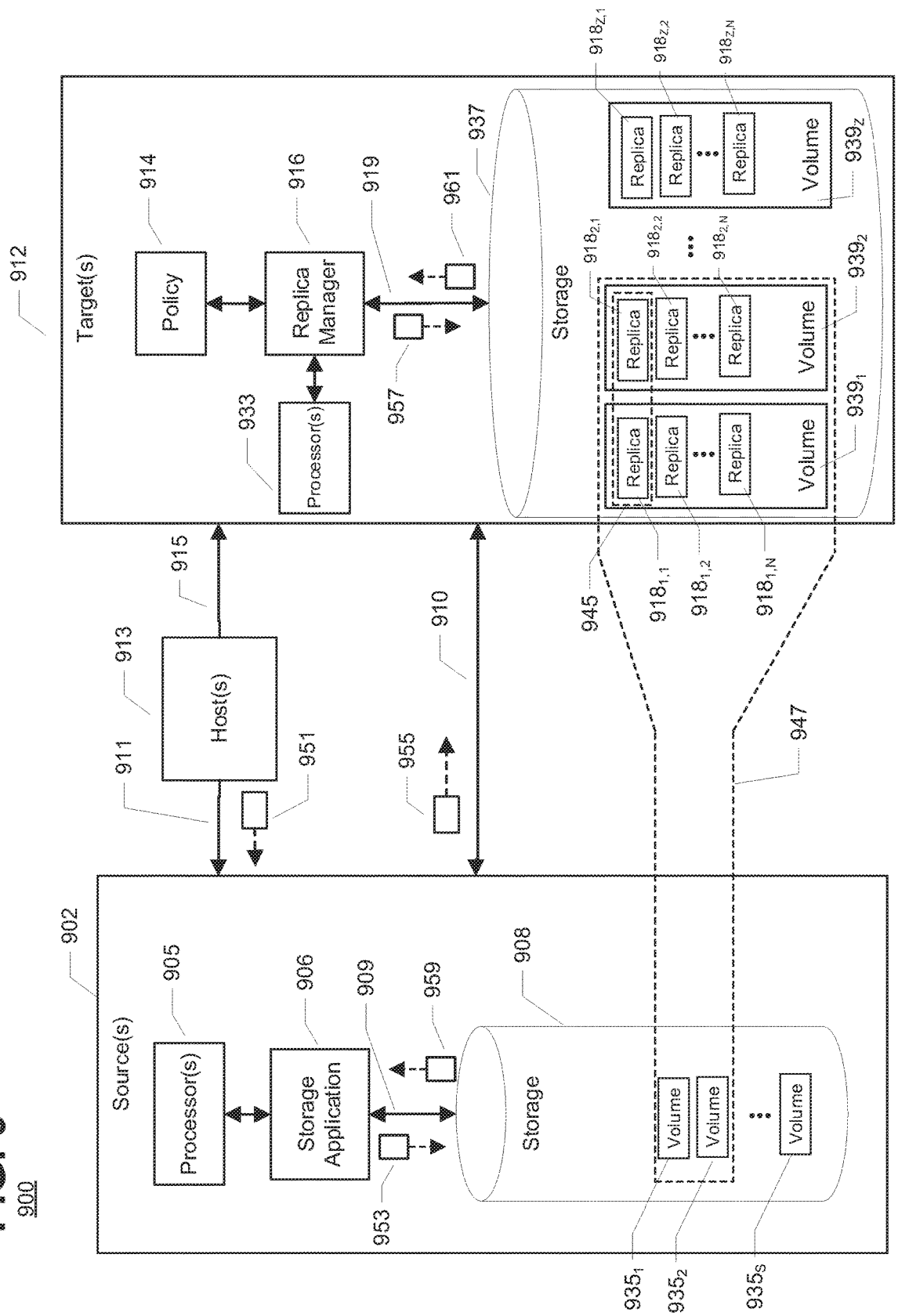
FIG. 9 is a schematic representation of a storage system that can include enhanced locking.

It is understood that embodiments of enhanced locking are applicable to a variety of systems, objects and applications. FIG. 9 shows an example storage system 900 that may perform thread management with enhanced lock in storage system 900, in accordance with illustrative embodiments. Storage system 900 may include at least one source site 902 and at least one target site 912, which may be co-located or geographically separated. Source site 902 may include one or more processors 905, storage application 906, and storage 908. In some embodiments, storage 908 may include one or more storage volumes $935_{1-S}$, that operate as active or production volumes. Source site 902 and target site 912 may be in communication with one or more hosts 913 via communication links 911 and 915, respectively.

Hosts 913 may perform input/output (I/O) operations on source-side storage 908 (e.g., read data from and write data to storage 908). In some embodiments, the I/O operations may be intercepted by and controlled by storage application 906. As changes are made to data stored on storage 908 via the I/O operations from hosts 913, or over time as storage system 900 operates, storage application 906 may perform operations to replicate data from source site 902 to target site 912 over communication link 910. In some embodiments, communication link 910 may be a long distance communication link of a storage area network (SAN), such as an Ethernet or Internet (e.g., TCP/IP) link that may employ, for example, the iSCSI protocol. In some embodiments, one or both of source site 902 and/or target site 912 may include one or more internal (e.g., short distance) communication links (shown as communication links 909 and 919), such as an InfiniBand (IB) link or Fibre Channel (FC) link. Communication link 909 may be employed to transfer data between storage volumes $935_{1-S}$ of storage 908 and one or both of storage application 906 and processor(s) 905. Communication link 919 may be employed to transfer data between storage volumes $939_{1-Z}$ of storage 937 and one or both of replica manager 916 and processor(s) 933.

In illustrative embodiments, target site 912 may include replica manager 916 that manages a plurality of replicas $918_{1-N}$ according to a policy 914 (e.g., a replication and/or retention policy). Replicas 918 may be stored in one or more volumes $939_{1-Z}$ of storage 937 of target site 912. A replica (or snapshot) may be created from data within storage 908 and transferred to one or more target sites 912 during a data replication cycle that may be performed based on data replication policies (e.g., policy 914) that may define various settings for data recovery operations. A data replication cycle may be asynchronous data replication performed at time-based intervals during operation of storage system 900, or may alternatively be synchronous data replication performed when data is changed on source site 902.

In illustrative embodiments, storage system 900 may include one or more consistency groups. A consistency group 947 may include one or more volumes 935 of source site 902, each associated with a corresponding volume 939 of target site 912. Consistency group 947 may treat source volumes 935 and target volumes 939 as a single logical entity for data replication and migration. Each volume 939 may store one or more associated replicas 918 that reflect the data in the consistency group 947 at a point in time (e.g., when the replica 918 was created). For example, replicas (e.g., snapshots) 918 may be generated for each source volume 935 of consistency group 947 at the same time, and stored on associated ones of target volumes 939. As shown in FIG. 9, an illustrative consistency group 947 may include two source volumes $935_1$ and $935_2$ and two target volumes $939_1$ and $939_2$. Each of target volumes $939_1$ and $939_2$ may include one or more replicas 918. In some embodiments, replicas 918 for respective source volumes 935 of consistency group 947 may be grouped into sets (e.g., a snapshot set or snapset 945).

In some embodiments, one of hosts 913 may send an I/O request (e.g., I/O request 951) to perform an I/O operation on storage 908 of source site 902. For example, I/O request 951 may be a request to read an associated amount of data from storage 908, or may be a request to write an associated amount of data to storage 908. In some embodiments, I/O request 951 may include one or more data packets. For example, FIG. 10A shows a block diagram of an illustrative data packet 1010. As shown in FIG. 10A, in some embodiments, data packet 1010 may include one or more of header data 1012, payload data 1014 and footer data 1016. Payload data 1014 may be the data to be written to storage 908 or data that is read from storage 908 (e.g., user data), and header data 1012 and/or footer data 1016 may be data associated with I/O request 951 that may be employed by storage system 900 to process I/O request 951 (e.g., source and/or destination address information, error correction information, data and/or packet format information, metadata, and other information).

In some embodiments, payload data 1014 may be segmented into one or more payload data segments to be written to storage 908 (e.g., by one or more write operations 953) or read from storage 908 (e.g., by one or more read operations 959). For example, if payload data 1014 is 256 KB, payload data 1014 may be segmented into sixteen 16 KB payload data segments to be written to storage 908. When I/O request 951 is a write request, processor(s) 905 and/or storage application 906 may then perform one or more corresponding write operations (e.g., write operation 953) to write payload data associated with the one or more data packets (e.g., one or more payload data segments) of I/O request 951 to storage 908. When I/O request 951 is a read request, processor(s) 905 and/or storage application 906 may then read data from storage 908 in one or more packets (e.g., one or more read operations 959) to process I/O request 951 from storage 908.

In illustrative embodiments, source site 902 may send a replica (e.g., replica 955) to target site 912. Similarly to I/O request 951, replica 955 may include one or more data packets such as shown in FIG. 10A. Processor(s) 933 and/or replica manager 916 may then perform one or more corresponding write operations (e.g., write operation 957) to write payload data (e.g., one or more payload data segments) associated with the one or more data packets of replica 955 to storage 937. Similarly, replica manager 961 may read replica data from storage 937 by one or more read operations 961. In some embodiments, data packet 1010 may be a data packet formatted in accordance with the TCP/IP and iSCSI protocols.

Referring to FIG. 10B, a block diagram of an illustrative storage array 1002 is shown. For example, in illustrative embodiments, one or both of storage 908 and storage 937 may be implemented as storage array 1002. As shown, in some embodiments, storage array 1002 may include one or more clusters $1004_1$-$1004_Q$ (referred to generally as clusters 1004) where Q may be a positive integer. In illustrative embodiments, clusters 1004 may include one or more physical and/or virtual storage volumes, shown generally as storage volumes 1006. For example, cluster $1004_1$ may include storage volumes $1006_{1,1}$-$1006_{1,R}$, where R may be a positive integer. For example, clusters 1004 may include one or more physical storage volumes such as hard disk drives (HDDs), solid state drives (SSDs) such as flash drives, a hybrid magnetic and solid state drive, etc., and/or one or more virtual storage volumes, such as a cloud storage, or a combination of physical storage volumes and virtual storage volumes.

Described embodiments may provide for management of threads of storage system 900. For example, storage system 900 may perform one or more threads of instructions or operations in response to receiving an I/O request (e.g., I/O request 951 of FIG. 9). For example, a thread may be a series of instructions performed by processor 905 in response to I/O request 951. In some embodiments, multiple threads may be performed concurrently. As threads are performed, a given thread may complete and expire. Described embodiments detach expired threads without a synchronization object that is external to the thread. For example, an external synchronization object may include an external semaphore, lock, or event that a thread may interact with to communicate with another thread. Some embodiments may allow two or more threads to communicate, and be synchronized, between one another without employing such external synchronization objects.

In some embodiments, an application (e.g., a server application for a given one of storage clusters 1004) may have a requirement (e.g., a hard time constraint) to reply to a client (e.g., host(s) 913) within a predefined time limit. Such applications may employ one or more synchronous threads to achieve the time limit.

For example, described embodiments may restart a given one of storage clusters 1004 of FIG. 10B. Upon restart, metadata associated with the cluster may have been demoted from a fast memory (e.g., a cache) into a slower memory (e.g., a disk). Thus, when a cluster is restarted, an I/O request to the cluster may take longer than usual, since the metadata may need to be retrieved from the slower memory instead of the fast memory. Thus, if a synchronous thread associated with the I/O request times out, described embodiments may complete loading the cluster metadata as a background operation. If a client repeats the I/O request to the cluster, the metadata may already be loaded in the memory by the background operation.

Described embodiments may employ one or more threads to perform operations of storage system 900 (e.g., operations associated with I/O request 951). For example, as shown in FIG. 10C, processors 1071 (e.g., one or more processors 905 and/or processors 933) may employ one or more threads 1079. Each thread 1079 may be a thread of one or more instructions 1077 that are performed by storage system 900. Each thread 1079 may also include context 1073. Context 1073 may include mailbox 1075 and one or more synchronization objects 1076. In some embodiments, threads 1079 may optionally be in communication with external synchronization objects 1081. For example, synchronization objects 1076 and/or 1081 may include a lock, a semaphore, or an event, by which threads may communicate with one another.

Referring to FIG. 10D, described embodiments may employ application programming interfaces (APIs) (e.g., APIs 1087) that allow an I/O caller thread 1083 to initiate background provider thread(s) 1085 and wait for either (a) completion of the background provider thread or (b) time out of the I/O caller thread. In described embodiments, if the I/O caller thread times out, the I/O caller thread detaches the background provider thread and the background provider thread continues (e.g., to completion) as a background (e.g., detached) thread. In described embodiments, if a thread completes, the thread may signal completion via a synchronization object (e.g., 1076 of FIG. 10C) such as a lock, a semaphore, or an event.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing the embodiments and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts that have been described and illustrated herein might be made by those skilled in the art without departing from the scope of the following claims.

What is claimed is:

1. A method for controlling a synchronization object of a computer processing system comprising:
   executing a plurality of processing threads, each of the processing threads having a priority level within the computer processing system;
   at least one of the plurality of threads requesting a lock to the synchronization object;
   promoting the priority of lower priority processing threads having a lock to the synchronization object or are waiting in a waiting queue for the synchronization object, the lower priority threads have a priority lower than the lock requesting thread and are promoted to a priority level that is at least as high as that of the lock requesting thread; and
   upon a release of the lock by a promoted processing thread, returning the promoted processing thread to the original priority level from which the processing thread was promoted;
   wherein the lock requesting thread terminates the request to the synchronization object if the lock is not available.

2. The method of claim 1 wherein promoting the priority level comprises communicating a signal from the lock requesting thread to the lower priority waiting threads.

3. The method of claim 1 wherein the promoted waiting threads return themselves to their original priority when they release a lock to the synchronization object.

4. The method of claim 1 wherein the lock requesting thread waits for a predetermined amount of time for the lock before terminating the request to the synchronization object.

5. The method of claim 1 wherein one or more additional lock requesting threads are configured to retry requesting a lock to the synchronization object until the requested lock is obtained.

6. The method of claim 5 wherein each retry of requesting the lock is performed by a separate lock requesting thread.

7. The method of claim 6 wherein each of the separate lock requesting threads that terminates a request to the synchronization object is terminated prior to a retry by a separate lock requesting thread.

8. The method of claim 1 wherein the lower priority threads are not promoted to a priority level that is higher than the lock requesting thread.

9. A system for controlling a synchronization object of a computer processing system comprising:
   one or more processors programmed and configured to cause the execution of:
      a plurality of processing threads, each of the processing threads having a priority level within the computer processing system;
      a synchronization object for synchronizing the processing of the one or more processing threads, the synchronization object comprising a waiting queue for processing requests made by the one or more processing threads;
      a lock requesting thread of the one or more processing threads that requests a lock to the synchronization object;
      promoting the priority of lower priority processing threads having a lock to the synchronization object or are waiting in the waiting queue, the lower priority threads have a priority lower than the lock requesting thread and are promoted to a priority level that is at least as high as that of the lock requesting thread; and
      upon a release of the lock by a promoted processing thread, returning the promoted processing thread to the original priority level from which the processing thread was promoted;
   wherein the lock requesting thread terminates the request to the synchronization object if the lock is not available.

10. The system of claim 9 wherein promoting the priority level comprises communicating a signal from the lock requesting thread to the lower priority waiting threads.

11. The system of claim 9 wherein the promoted waiting threads return themselves to their original priority when they release a lock to the synchronization object.

12. The system of claim 9 wherein the lock requesting thread waits for a predetermined amount of time for the lock before terminating the request to the synchronization object.

13. The system of claim 9 wherein one or more additional lock requesting threads are configured to retry requesting a lock to the synchronization object until the requested lock is obtained.

14. The system of claim 13 wherein each retry of requesting the lock is performed by a separate lock requesting thread.

15. The system of claim 14 wherein each of the separate lock requesting threads that terminates a request to the synchronization object is terminated prior to a retry by a separate lock requesting thread.

16. The system of claim 9 wherein the lower priority threads are not promoted to a priority level that is higher than the lock requesting thread.

17. A computer program product for sharing computing resources, the computer program product comprising a non-transitory computer-readable storage medium encoded with computer-executable program code programmed to cause the execution across one or more processors of:

executing a plurality of processing threads, each of the processing threads having a priority level within the computer processing system;

at least one of the plurality of threads requesting a lock to the synchronization object;

promoting the priority of lower priority processing threads having a lock to the synchronization object or are waiting in a waiting queue for the synchronization object, the lower priority threads have a priority lower than the lock requesting thread and are promoted to a priority level that is at least as high as that of the lock requesting thread; and upon a release of the lock by a promoted processing thread, returning the promoted processing thread to the original priority level from which the processing thread was promoted;

wherein the lock requesting thread terminates the request to the synchronization object if the lock is not available.

\* \* \* \* \*